United States Patent
Jordan et al.

[19]

[11] Patent Number: 5,829,785
[45] Date of Patent: Nov. 3, 1998

[54] INTERNAL STRUCTURE FOR A TWO-WALLED INFLATOR

[75] Inventors: Michael P. Jordan, South Weber; Christopher Hock, Uintah; Matthew A. Cox, Bountiful; Alan J. Ward, North Ogden, all of Utah

[73] Assignee: Morton International, Inc., Chicago, Ill.

[21] Appl. No.: 620,664

[22] Filed: Mar. 26, 1996

[51] Int. Cl.⁶ .................................................. B60R 21/26
[52] U.S. Cl. ........................... 280/741; 102/530; 280/736
[58] Field of Search .................................. 280/736, 741, 280/742, 737, 740; 102/530, 531

[56] References Cited

U.S. PATENT DOCUMENTS

| | | | |
|---|---|---|---|
| 3,934,984 | 1/1976 | Marlow et al. | 23/281 |
| 3,958,949 | 5/1976 | Plantif et al. | 23/281 |
| 4,943,086 | 7/1990 | Cunningham | 280/741 |
| 5,009,855 | 4/1991 | Nilsson | 422/164 |
| 5,100,171 | 3/1992 | Faigle et al. | 280/736 |
| 5,189,255 | 2/1993 | Fukabori et al. | 102/531 |
| 5,217,515 | 6/1993 | Guglielmi | 55/526 |
| 5,217,697 | 6/1993 | Kanazawa et al. | 422/165 |
| 5,340,150 | 8/1994 | Harada et al. | 280/740 |
| 5,342,083 | 8/1994 | Gentile et al. | 280/728 A |
| 5,345,875 | 9/1994 | Anderson | 102/530 |
| 5,398,967 | 3/1995 | Carothers et al. | 280/736 |
| 5,419,578 | 5/1995 | Storey et al. | 280/741 |
| 5,451,381 | 9/1995 | Kishimoto et al. | 422/305 |
| 5,468,016 | 11/1995 | Kobari et al. | 280/741 |

FOREIGN PATENT DOCUMENTS

| | | |
|---|---|---|
| 2274015 | 1/1976 | France . |
| 2538386 | 3/1976 | Germany . |
| 1406067 | 9/1975 | United Kingdom .................. 280/736 |
| 1500157 | 2/1976 | United Kingdom . |

*Primary Examiner*—Eric D. Culbreth
*Attorney, Agent, or Firm*—Corinne R. Gorski; Gerald K. White

[57] ABSTRACT

A gas generating inflator assembly for a vehicle safety restraint system including an inflator housing having two walls, an inner wall and an outer wall. The inner and outer walls form a combustion chamber therebetween. A filter pack is disposed within the combustion chamber along an inner diameter of the outer wall. Gas generant is also disposed within the combustion chamber. An internal structure is disposed within the combustion chamber for diffusing the ignitor blast and retaining slag produced by the ignited gas generant. The internal structure is spaced from the filter pack and the inner wall such that a portion of the gas generant is located between the internal structure and the inner wall and another portion of the gas generant is located between the internal structure and the filtration pack. The internal structure can be a ring of solid material, an expanded metal material or screen, a star-shaped configuration having a plurality of portions contacting an inner diameter of the filter pack, or a solid metal structure which may include an internal porous structure screen of wire mesh or expanded metal attached thereto.

7 Claims, 3 Drawing Sheets

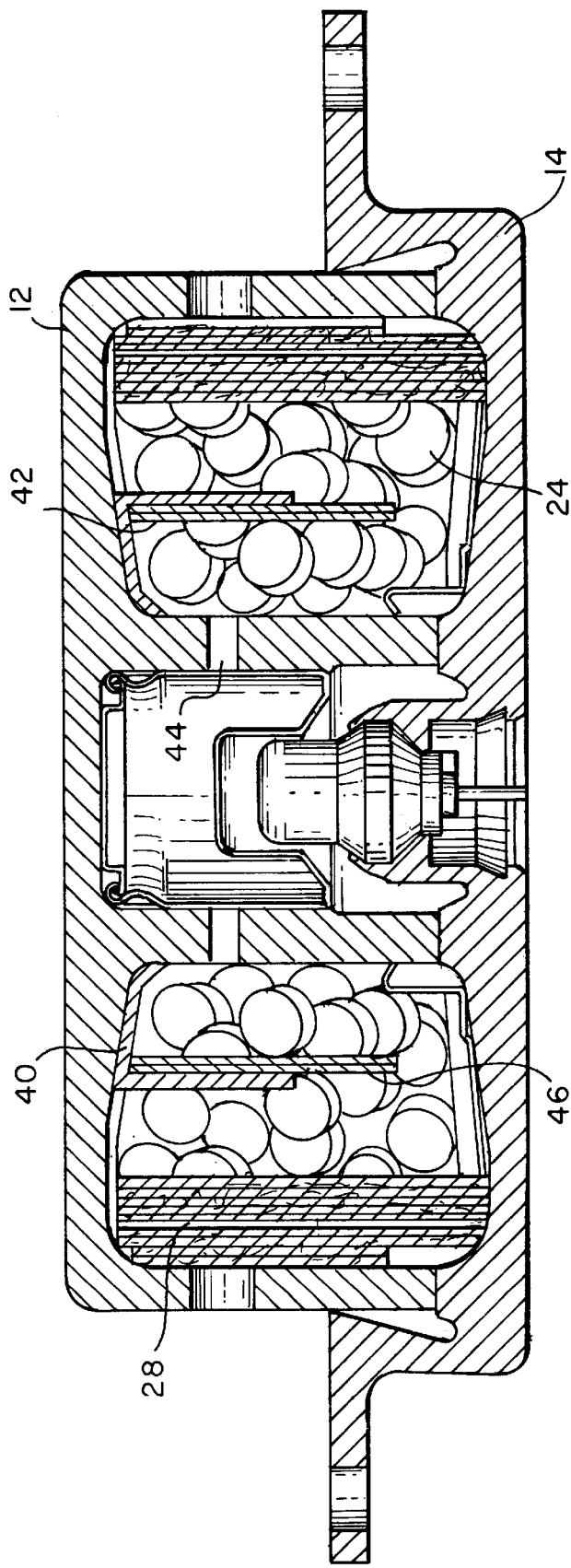

INTERNAL STRUCTURE FOR A TWO-WALLED INFLATOR

BACKGROUND OF THE INVENTION

1. Field of the Invention

The present invention relates to a two-walled inflator housing assembly for a vehicle safety restraint system, and more particularly, to an inflator housing assembly incorporating a separate internal structure.

2. Description of the Related Art

Many different forms of inflators for generating gas to inflate and expand an airbag of a vehicle safety restraint system are known. One common form of inflator is a housing including a top and bottom plate joined by three cylindrical walls dividing the inflator into an igniter chamber, a combustion chamber, and a filter chamber, as disclosed in U.S. Pat. No. 5,419,578, assigned to the assignee of the present invention. The three-walled design allows confinement of the gas generant in an area where it can be ignited and filtered readily. One disadvantage with the three-walled inflator designs is the increased weight and cost associated with manufacture and assembly.

Efforts to reduce inflator cost and weight have resulted in the development of two-walled inflator housings which have a single combustion/filtration chamber for the combustion of gas generant and the filtration of the gas produced in the same area in which the gas generant is contained. This filter screenpack inherently includes a large void volume. When the ignition blast is fired directly at the filter screenpack a large portion of the energy of the ignition blast will expand into these void areas, reducing ignition efficiency. This reduction in the effectiveness of the ignitor results in a loss of performance.

Another disadvantage of a single combustion and filtration chamber in combination with a ported ignition chamber is that the ignition blast fires directly at the filtration screen pack, causing degradation of the filter. This degradation occurs because such an arrangement exposes the outer filter directly to slag jetting created by the ignitor material and gas generant.

U.S. Pat. No. 5,009,855 discloses a three-wall inflator having a separate combustion and filtration chamber, including a divider or insert within the combustion chamber which separates the generant into a smaller volume closest to the internal wall and a larger volume closest to the exit port leading to the filtration chamber. This arrangement allows for a slow combustion which partially inflates the air bag followed by a fast combustion which completes inflation. Thus, the divider is located within the combustion chamber to direct flow. The divider blocks the direct jetting of the ignition blast only within the combustion chamber. The combustion wall is ported which exposes the filter to jetting from the combustion chamber. Moreover, the divider does not provide for the retention of the majority of the slag produced by the generant, because the majority of the generant is located outside the divider. Thus, no means are provided for reducing the exposure of the outer filter to the clogging and heating effect of excess slag.

U.S. Pat. No. 5,340,150 discloses a two-wall inflator including a partitioning wall for dividing the inner and outer vessel bodies of the housing. The generant is located within the gas generating chamber, enclosed by the partitioning wall. The partitioning wall is not designed to block the filter pack from the ignition blast or from the slag produced by the generant, thus protecting the filter. The combustion filter itself is located internally of the partitioning wall. The gas flow exits the chamber made by the partitioning wall through discrete ports.

Thus, there is the need for a two-wall inflator design which also includes means for protecting the outer filter pack from the ignition blast, improving ignition performance.

SUMMARY OF THE INVENTION

The present invention overcomes some of the drawbacks of the two-wall inflator by confining some or all of the generant in an internal region formed by the inflator internal wall and a separate internal structure.

An object of the present invention is to provide a two-walled inflator housing including an internal structure separate from the existing filter pack or support structure which blocks the filter pack from the ignition blast.

Since the internal structure is manufactured separately from the filter pack and inflator assembly, its shape and material can be easily modified as required.

Another object of the present invention is to provide an internal structure which overcomes some of the disadvantages of two-wall inflator designs by confining the ignitor jetting within an internal region of the inflator, causing the ignitor blast to diffuse through the generant bed, thus increasing ignition efficiency and combustion.

A further object of the present invention is that the internal structure provides a site for slag to nucleate upon and to allow an increased rate of slag retention and cooling of effluent.

Still another object of the present invention is to provide an internal structure which reduces the exposure of the outer filter to clogging and heating effects produced by excessive slag exposure.

A potential advantage of the present invention is improved gas effluent levels for some azide free gas generant formulas because of improved combustion.

In accomplishing these and other objectives of the present invention, there is provided a gas generating inflator assembly for a vehicle safety restraint system comprising an inflator housing having two walls, an inner wall and an outer wall. The inner and outer walls form a combustion chamber therebetween. A filtration pack is disposed within the combustion chamber along an inner diameter of the outer wall. Gas generant is also disposed within the combustion chamber. Means for igniting the gas generant are provided. Internal structure means are disposed within the combustion chamber for retaining slag produced by the ignited gas generant. The internal structure means is spaced from the filter pack and the inner wall such that a portion of the gas generant is located between the internal structure means and the inner wall and another portion of the gas generant is located between the internal structure means and the filtration pack.

The internal structure of the present invention is not designed to control the flow of the generant gas, as the divider of U.S. Pat. No. 5,009,855, but to block or diffuse the direct jetting of the ignition blast from attacking the outer screen pack. Sufficient open area is provided in the inflator so as to not restrict the flow of the gases from the generant located inside the internal structure to that located outside of the structure. The gas may flow over the structure or therethrough, depending on the solid/open characteristics of the structure. Moreover, because the filter pack is blocked from the ignition blast it provides better filtration of the gas generant slag.

The present invention provides for the location of generant on both sides of the internal structure and is not a solid wall from the top to the bottom of the inflator, but allows for the gas flow to diffuse through or over the top of the structure, not limiting the gas to flow through discrete ports, as in U.S. Pat. No. 5,340,150. The gas flow diffusing through or over the top of the structure allows for a more even flow into the outer filtration screen pack.

Other features and advantages of the present invention will become apparent from the following description of the invention which refers to the accompanying drawings.

BRIEF DESCRIPTION OF THE DRAWINGS

FIG. 4 is a cross-section of a two-walled inflator housing incorporating another embodiment of the internal structure of the present invention.

DETAILED DESCRIPTION OF THE PREFERRED EMBODIMENTS

Figure 1:
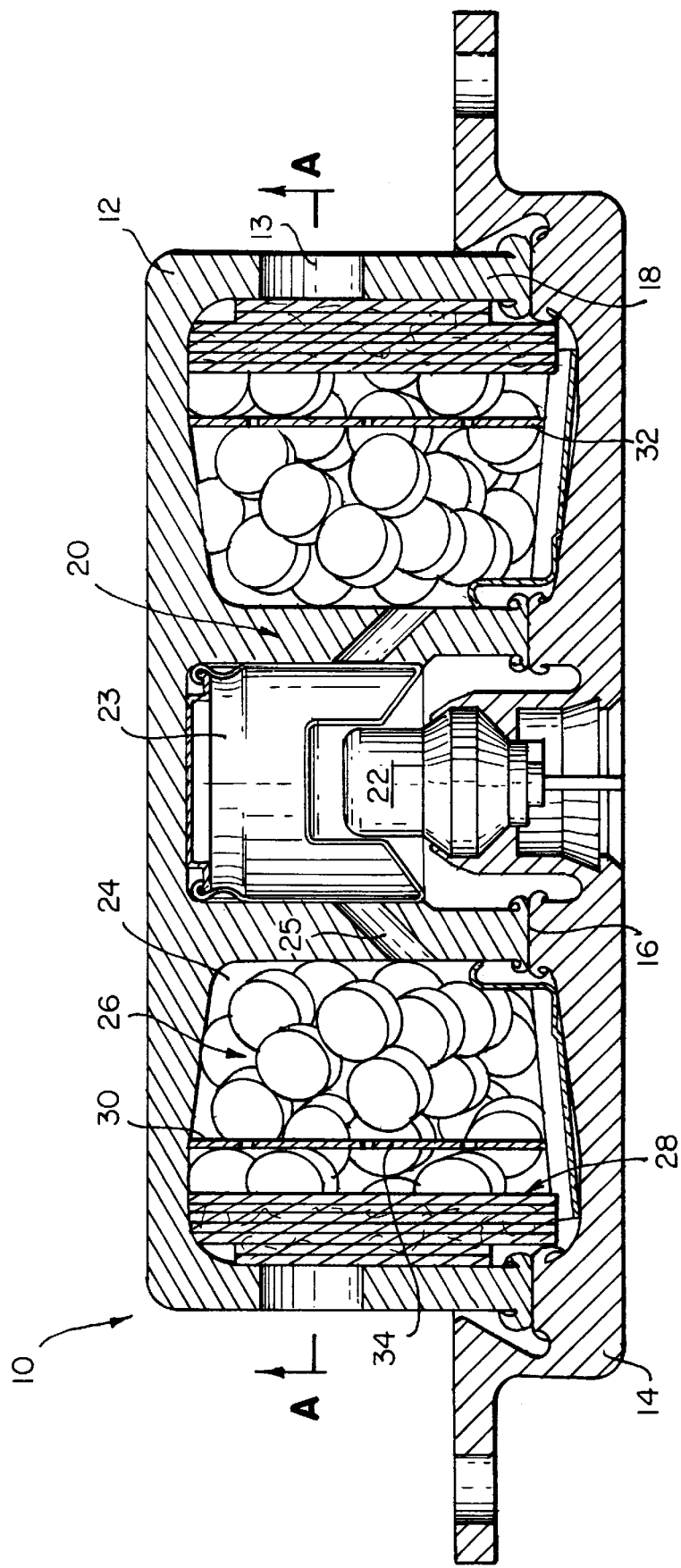
FIG. 1 is a cross-section of a two-walled inflator housing incorporating the internal ring structure of the present invention.

Referring to FIG. 1, there is shown an inflator or gas generator 10 which is used to inflate an air bag (not shown) of a vehicle safety restraint system. Inflator 10 includes a cylindrical housing construction of two components, an upper shell 12 and a lower base 14, both of which may be composed of a light weight material, such as aluminum. Upper shell 12 and lower base 14 are joined by a series concentric inertia welds 16, as is known in the prior art.

Upper shell 12 is of a two-walled design consisting of an outer wall 18 and an inner wall 20. Inner wall 20 houses an initiator or squib 22, as is known in the prior art. Inner and outer walls 18, 20 defining a single combustion and filter chamber 24.

Disposed within chamber 24 and surrounding inner wall 20 are uniformly distributed pellets 26 of a gas generant material which can be composed of any number of different compositions. During operation, in response to a collision, a collision sensor (not shown) sends an electrical pulse to the initiator 22 which ignites an ignitor assembly 23 to burn the pyrotechnic material contained within assembly 23, which in turn passes through ignitor exit holes 25 to ignite the gas generant pellets 26.

A filtration pack 28 is also located within chamber 24 surrounding an inner diameter of outer wall 18. Filtration pack 28 is a particulate filter which surrounds exit ports 13 disposed in the outer wall 18. Filtration pack 28 serves to cool and remove particulate residue from the hot generated gases.

Figure 2:
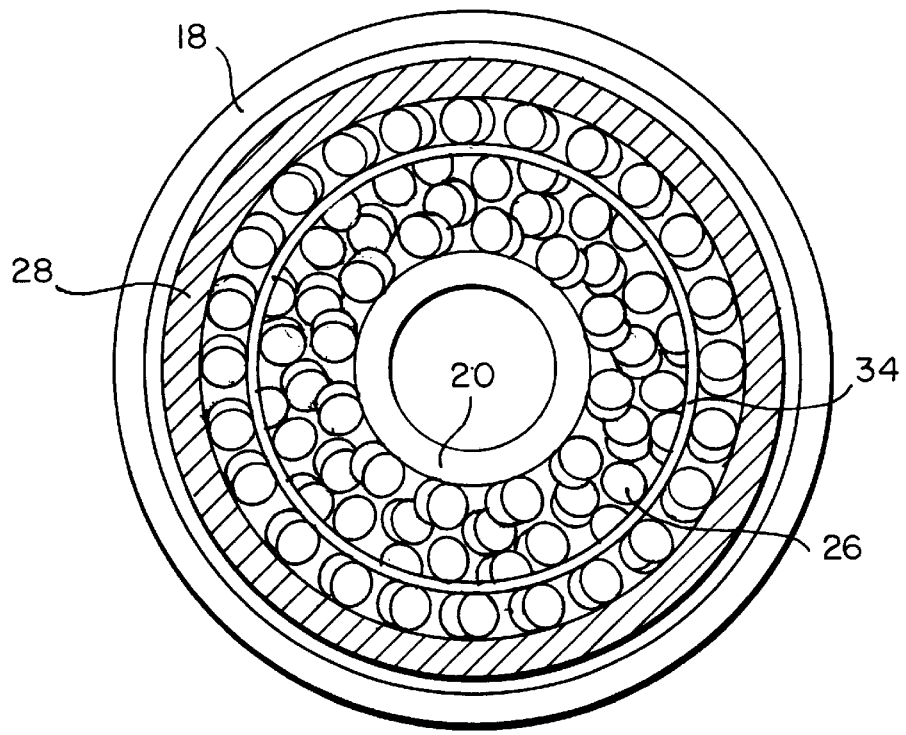
FIG. 2 is a cross-section of the inflator housing of the present invention taken along line A—A of FIG. 1.
Figure 3:
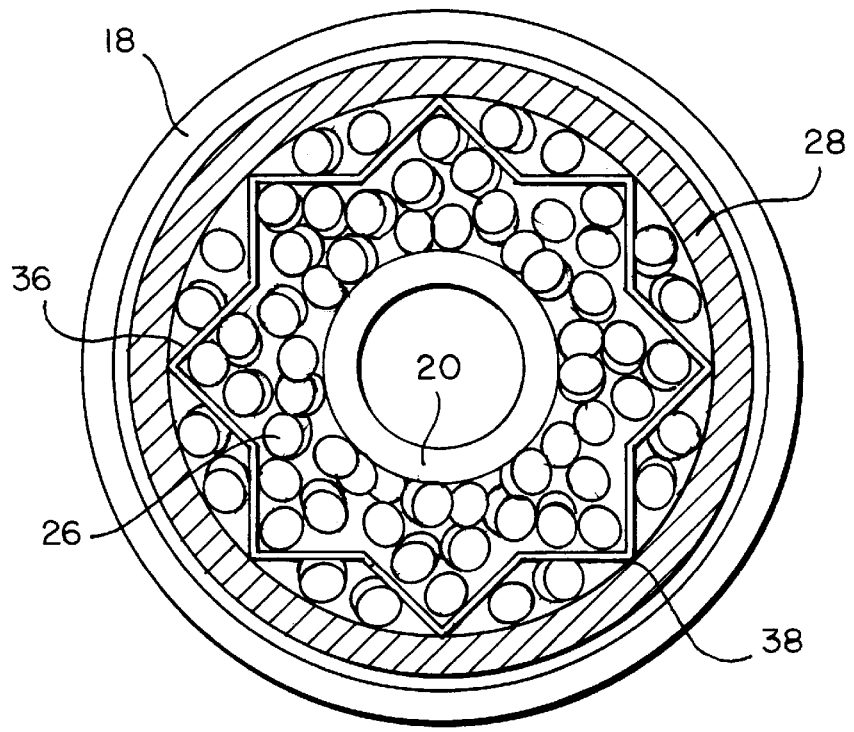
FIG. 3 is a cross-section of the inflator housing incorporating another embodiment of the internal ring structure of the present invention.

Spaced from filtration pack 28 and disposed within chamber 24 is an internal structure 30. Structure 30 can be a ring of solid material 32, including perforations 34, as shown in FIG. 1. In another embodiment, as shown in FIG. 2, structure 30 can be of an expanded metal material or screen which is spaced inwardly from filter 28. Structure 30 can also have a convoluted shape, such as the star configuration, shown in FIG. 3, with portions 38 of the structure contacting the filter 28 at its inner diameter. Porting of convoluted structure 36, shown in FIG. 3, can be controlled to promote mixing, which may improve combustion. Structure 30 may also be bonded or foil coated.

As shown in FIGS. 1–4, the gas generant pellets 26 may be located on either side of the internal structure or only on the inside of the structure between the structure and inner wall 20. By confining a portion of generant 26 between the internal structure and inner wall 20 the generant is exposed to the full effect of the ignition blast from squib 22 and the ignition material (not shown). This confinement allows the pressure to increase, which in turn, increases the ignition of gas generant 26 resulting in an increased rise rate and performance of the inflator.

The internal structure of the present invention also allows slag produced during combustion to condense and collect on the structure. This reduces the exposure of the outer filter to the clogging and heating effects of excessive slag exposure.

In the present invention, improved ignition occurs due to the ignition blast being diffused through the generant bed. The energy from the ignition is blocked from flowing as a jet directly into the void volume of the filter by the internal structure. Moreover, the internal structure diffuses the ignition energy therethrough allowing generant located on the outside of the internal structure to be exposed to the full effect of the ignitor blast.

Referring to FIG. 4, in another embodiment of the invention, the internal structure comprises a solid metal internal structure 40, for example, carbon steel, which is press fit with the center post of upper shell 12. Attached to solid structure 40 is a porous structure 42. Porous structure 42 can be an internal wrap of screen, for example, a 30 mesh screen of carbon steel which is wrapped twice about internal structure 40. Porous structure 42 can also be made of an expanded metal.

Solid structure 40 and porous structure 42 are placed in combustion and filter chamber 24 between ignitor exit holes 44 and filter pack 28. Porous structure 42 diffuses the generated gas as it passes therethrough, and thus, the igniter blast is not confined to passing through discrete ports, as disclosed in the prior art.

As shown in FIG. 4, solid metal structure 40 and porous structure 42 do not extend through the entire height of chamber 24, but instead are spaced from base 14 to provide a flow region 46 around the internal structure. It should be understood that screen wrap 42 does not need to extend along the entire length of solid structure 40, but can only partially cover the same. Likewise, if desired, screen wrap 42 can extend from solid structure 40 to base 14.

Next, the present invention will be explained further with reference to the following examples:

Example 1

An inflator was built incorporating a 16 cornered star-shaped inner structure made from expanded metal. The inflator was tested at ambient conditions. The inner structure retained approximately 75% of the gas generant slag on its inner surface, instead of the filter. The structure also increased the 20 ms pressure indicating improved ignition.

Example 2

Three different inflators were built and tested at 90° C. Each of the inflators included an internal structure made of expanded metal. Inflator S/N 001 used a star-shaped structure as in Example 1. Inflator S/N 002 used an internal structure with a 2.35 in. outer diameter wall. Inflator S/N 003 used an internal structure with 2.35 in. outer diameter wall having a 0.002 in. aluminum foil bonded to its inner diameter. Of the three inflators tested, S/N 001 worked best in cooling and filtering the gases. S/N 002 had increased pressure of approximately 10% at all times, compared to S/N 001 with about the same residues. S/N 003 had considerable filter damage and high residue weights.

Example 3

Two inflators were built and tested at ambient conditions using an internal structure made from expanded metal. Inflator S/N 004 used a structure having a round wall with an outer diameter of 1.85 in., allowing a row of generant to be loaded between the structure and the filter assembly. Inflator S/N 005 had an internal structure wrapped tightly against an inner diameter of the filter assembly. S/N 005 produced higher combustion pressures than S/N 004, but did not retain as much slag on its surface.

Example 4

Inflators of two different types of ignitor conditions, wherein different types and quantities of pyrotechnic materials were used, were built with a wrap of expanded metal forming the internal structure 30. The filter screen pack showed some ignitor hole damage, but less than that noticed by other designs without the expanded metal screen structure.

Example 5

A unitary filter, such as the filter manufactured by Pall Filtration Co. of Cortland, N.Y., was tested with an internal structure made of a star-shaped piece of Exmet, manufactured by Exmet Corp. of Naugatuck, Conn. The internal structure caused a dramatic improvement in the retention of slag inside the combustion chamber. Approximately 75% of the slag was retained on the internal structure.

Example 6

A solid metal structure with an internal wrap of screen was placed between the ignitor exit holes and the filtration pack. Gas generant was loaded on both sides of the structure. During testing, erosion of the metal structure was noted, however, erosion of the filter was reduced significantly. A faster ignition and lower residue weight was also observed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A gas generating inflator assembly for a vehicle safety restraint system, comprising:

an inflator housing having two walls, an inner wall and an outer wall, the inner and outer walls forming a combustion chamber;

a filter pack disposed in the combustion chamber along an inner diameter of the outer wall;

gas generant disposed within the combustion chamber;

means for igniting the gas generant; and an internal structure disposed within the combustion chamber for retaining slag produced by the ignited gas generant, wherein the internal structure is located between the filter pack and the inner wall such that a majority of the gas generant is located between the internal structure and the inner wall and only a small portion of the gas generant is located between the internal structure and the filter pack.

2. The inflator assembly of claim 1, wherein the internal structure comprises a ring of perforated, solid material.

3. The inflator assembly of claim 1, wherein the internal structure comprises an expanded metal screen.

4. A gas generating inflator assembly for a vehicle safety restraint system, comprising:

an inflator housing having two walls, an inner wall and an outer wall, the inner and outer walls forming a combustion chamber;

a filter pack disposed in the combustion chamber along an inner diameter of the outer wall;

gas generant disposed within the combustion chamber;

means for igniting the gas generant; and an internal structure disposed within the combustion chamber for retaining slag produced by the ignited gas generant, wherein the internal structure comprises a star-shaped expanded metal material located between the filter pack and the inner wall, the internal structure having a plurality of portions contacting an inner diameter of the filter pack such that a portion of the gas generant is located between the internal structure and the inner wall and another portion of the gas generant is located between the internal structure and the filter pack.

5. A gas generating inflator assembly for a vehicle safety restraint system comprising:

an inflator housing having two walls, an inner wall and an outer wall, the inner and outer walls forming a combustion chamber;

a filter pack disposed in the combustion chamber along an inner diameter of the outer wall;

gas generant disposed within the combustion chamber;

means for igniting the gas generant;

an internal structure disposed within the combustion chamber for retaining slag produced by the ignited gas generant, wherein the internal structure comprises a solid metal material located between the filter pack and the inner wall such that a portion of the gas generant is located between the metal material and the inner wall and another portion of the gas generant is located between the metal material and the filter pack; and a porous structure attached to the solid metal material.

6. The inflator assembly of claim 5, wherein the internal porous structure comprises a screen of wire mesh.

7. The inflator assembly of claim 5, wherein the internal porous structure comprises an expanded metal.

* * * * *